United States Patent
Kobayashi et al.

(10) Patent No.: US 11,194,499 B2
(45) Date of Patent: Dec. 7, 2021

(54) CACHING METHOD FOR HYBRID CLOUD STORAGE RUNNING DEV/TEST ON PUBLIC CLOUD

(71) Applicant: Hitachi, Ltd., Tokyo (JP)

(72) Inventors: Miho Kobayashi, San Jose, CA (US); Masanori Takada, Tokyo (JP); Satoshi Kaneko, Kanagawa (JP); Akira Yamamoto, Kanagawa (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/691,484

(22) Filed: Nov. 21, 2019

(65) Prior Publication Data

US 2021/0157498 A1    May 27, 2021

(51) Int. Cl.
*G06F 3/06* (2006.01)
*G06F 16/27* (2019.01)

(52) U.S. Cl.
CPC .......... *G06F 3/0644* (2013.01); *G06F 3/0604* (2013.01); *G06F 3/067* (2013.01); *G06F 3/0652* (2013.01); *G06F 3/0656* (2013.01); *G06F 3/0659* (2013.01); *G06F 16/27* (2019.01)

(58) Field of Classification Search
CPC ...... G06F 3/0659; G06F 3/0604; G06F 3/067; G06F 3/0644; G06F 3/0656; G06F 16/27; G06F 3/0652

USPC .......................................................... 711/154
See application file for complete search history.

(56) References Cited

U.S. PATENT DOCUMENTS

| | | | |
|---|---|---|---|
| 9,298,734 B2 | 3/2016 | Kishimoto et al. | |
| 10,740,187 B1* | 8/2020 | Prabhakar | G06F 11/1448 |
| 2013/0097377 A1* | 4/2013 | Satoyama | G06F 3/065 |
| | | | 711/114 |
| 2019/0050163 A1* | 2/2019 | Dewey | G06F 3/0665 |
| 2020/0133491 A1* | 4/2020 | Nanda | G06F 3/0653 |

* cited by examiner

*Primary Examiner* — Hua J Song
(74) *Attorney, Agent, or Firm* — Procopio, Cory, Hargreaves & Savitch LLP

(57) ABSTRACT

Example implementations described herein are directed to management of a first storage system for an on-premise system and a second storage system for a public cloud system. Such example implementations can involve, responsive to an update to one or more of a plurality of snapshot volumes in the first storage system, updating first shared page information stored in the first storage system according to the update to the one or more snapshot volumes, the first shared page information indicative of pages shared between the plurality of snapshot volumes in the first storage system; transmitting instructions to the second storage system to copy the updates to the one or more snapshot volumes from the first shared page information to a second shared page information stored in the second storage system; and executing read or write operations made to the second storage system based on the second shared page information.

16 Claims, 8 Drawing Sheets

Management Area (Public Cloud) 215

Snapshot shared page info.

| Page No. | Snapshot VOL1 | Snapshot VOL 2 |
|---|---|---|
| 0 | ON | OFF |
| 1 | ON | ON |
| ... | | |

Clone VOL info.

| Clone VOL No. | Snapshot VOL No. | First VOL LBA |
|---|---|---|
| 1-1 | 1 | 0x0010 |
| 1-2 | 1 | 0x0100 |
| 2-1 | 2 | 0x0150 |
| ... | | |

Write Buffer info.

| Clone VOL No. | VOL LBA | Buffer area (LBA) |
|---|---|---|
| 1-2 | 0x0200 | 0x0400 |
| 2-1 | 0x0700 | 0x0600 |
| ... | | |

Read Buffer info.

| Clone VOL No. | VOL LBA | Buffer area (LBA) |
|---|---|---|
| 1-1 | 0x0090 | 0x0900 |
| 2-1 | 0x0870 | 0x0950 |
| ... | | |

Other Managements info.

FIG. 4

CACHING METHOD FOR HYBRID CLOUD STORAGE RUNNING DEV/TEST ON PUBLIC CLOUD

BACKGROUND

Field

The present disclosure is related generally to cloud systems, and more specifically, to caching for hybrid cloud storage systems.

Related Art

The demand for Information Technology (IT) infrastructure flexibility is increasing the number of companies using public cloud implementations. However, the companies have sensitive data that is maintained in data centers managed by the corresponding company. Therefore, one related art IT environment implementation involves utilizing a mix of on-premise storage and public cloud, which is known as a hybrid cloud. Development and test (Dev/test) is example use cases for hybrid cloud, as users can create and delete dev/test environments easily with public clouds.

An example scenario for dev/test in hybrid clouds is as follows. In on-premise storage, there can be source data for normal functionality that users wish to use for dev/test. To create a rest point, users take a snapshot of the source data and copy snapshot data from on-premise storage to a public cloud that involves a dev/test compute machine. In a public cloud, there are many compute machines for dev/test projects. Since the rest point of the source data to be used can vary depending on the dev/test project, several snapshots are created for the source data. Further, the desired copy data from any snapshot can be copied by a project to a public cloud system.

In the above case, the same data may exist in part of the dev/test data created from different snapshots. However, a project is unaware as to which data is shared between other projects since shared snapshot data information is not stored in the public cloud. That means a project can copy the same data that was already copied to the public cloud for use by another project.

Such problems result in applying an extra load to the network between the on-premise storage to the public cloud. The network may become a performance bottleneck, since network specifications (bandwidth/speed) between on-premise and public clouds are not high. Furthermore, an extra network line usage fee from a public cloud (e.g., pay-as-you-go billing) can occur due to the long data transfer time.

To address such issues, related art implementations copy a part of shared snapshot data information from on-premise storage to public cloud to determine whether the data has been copied from the on-premise storage in the public cloud. Further, a unique command is issued from on-premise storage to a public cloud to create/update the information when a snapshot is taken in on-premise.

In the related art, there are storage systems, computer systems and data migration methods that involve a storage subsystem capable of realizing efficient data migration and high access performance. During migration of data between storage subsystems, data migration methods are selected between a "PUSH" type and a "PULL" type method based on a data migration policy set in advance to perform data migration processes.

SUMMARY

However, efficient data migration cannot be performed in consideration of snapshot data sharing.

Aspects of the present disclosure can include a method for managing a first storage system for an on-premise system and a second storage system for a public cloud system, the method involving, responsive to an update to one or more of a plurality of snapshot volumes in the first storage system, updating first shared page information stored in the first storage system according to the update to the one or more snapshot volumes, the first shared page information indicative of pages shared between the plurality of snapshot volumes in the first storage system; transmitting instructions to the second storage system to copy the updates to the one or more snapshot volumes from the first shared page information to a second shared page information stored in the second storage system; and executing read or write operations made to the second storage system based on the second shared page information.

Aspects of the present disclosure can involve a non-transitory computer readable medium, storing instructions for managing a first storage system for an on-premise system and a second storage system for a public cloud system, the instructions involving, responsive to an update to one or more of a plurality of snapshot volumes in the first storage system, updating first shared page information stored in the first storage system according to the update to the one or more snapshot volumes, the first shared page information indicative of pages shared between the plurality of snapshot volumes in the first storage system; transmitting instructions to the second storage system to copy the updates to the one or more snapshot volumes from the first shared page information to a second shared page information stored in the second storage system; and executing read or write operations made to the second storage system based on the second shared page information.

Aspects of the present disclosure can include a system for managing a first storage system for an on-premise system and a second storage system for a public cloud system, the system involving, responsive to an update to one or more of a plurality of snapshot volumes in the first storage system, means for updating first shared page information stored in the first storage system according to the update to the one or more snapshot volumes, the first shared page information indicative of pages shared between the plurality of snapshot volumes in the first storage system; means for transmitting instructions to the second storage system to copy the updates to the one or more snapshot volumes from the first shared page information to a second shared page information stored in the second storage system; and means for executing read or write operations made to the second storage system based on the second shared page information.

BRIEF DESCRIPTION OF DRAWINGS

FIG. 4 illustrates the management area in a public cloud, in accordance with an example implementation.

DETAILED DESCRIPTION

Figure 1:
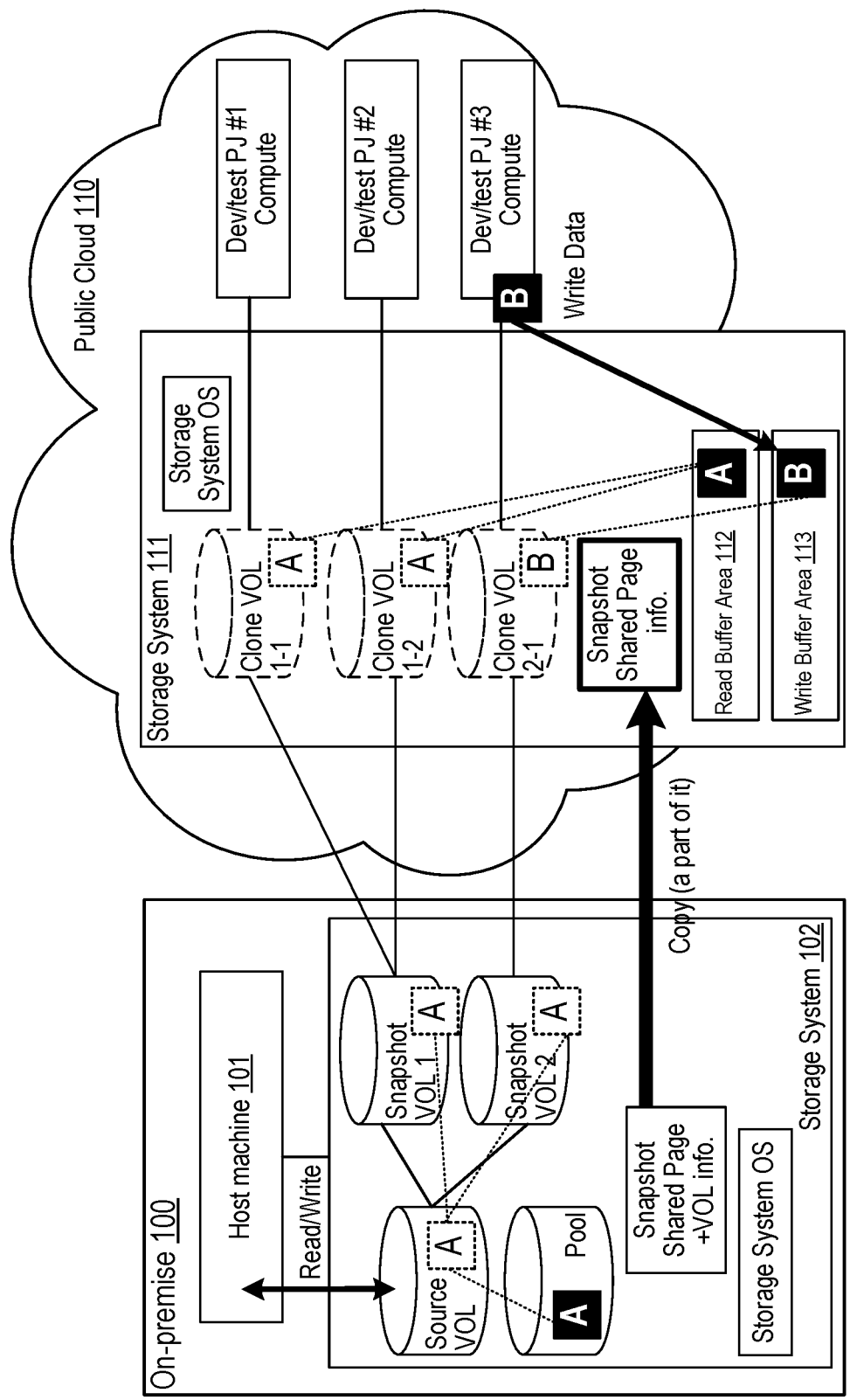
FIG. 1 illustrates an example outline of the system, in accordance with a first example implementation.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

In an example implementation, a storage system in public cloud creates the snapshot shared page information. Example implementations described herein are directed to how dev/test project reads/writes the data created from the snapshot of on-premise, how a storage system in public cloud updates the snapshot shared page information, and so on.

FIG. 1 illustrates an example outline of the system, in accordance with a first example implementation. In an example implementation, there can be an on-premise system 100 and public cloud 110, which are connected to each other via a network. Further details of the hardware architecture of the on-premise 100 and public cloud system 110 are provided with respect to FIG. 2.

In the on-premise system 100, there is a host machine 101 managing a storage system 102. Snapshot volumes are created from the source volume. In the example of FIG. 1, data A is the shared data that is shared with the with source volume and snapshot volumes and stored in the pool. Some data is shared with the source volume and a snapshot volume if the host machine updates the source volume after taking the snapshot volume VOL 1. The shared data of the snapshot are managed with page units. To manage the shared data, there is the information of snapshot shared page and volume in on-premise systems 100.

In a public cloud 110, there can be a storage system 111 and compute machines. In a storage system, the copy of the snapshot volume in the on-premise systems is created virtually, which is called a clone volume. Further, the snapshot shared page information is created by copying the portions of the snapshot shared page and volume information from the on-premise system 100. If a compute issues a request involving a read data command and the specified data is not stored in the public cloud 110, the data is copied from the on-premise system 100 and stored in the read buffer area 112. If a compute machine issues a request involving a write data command, the write data is stored in the write buffer area 113.

Figure 2:
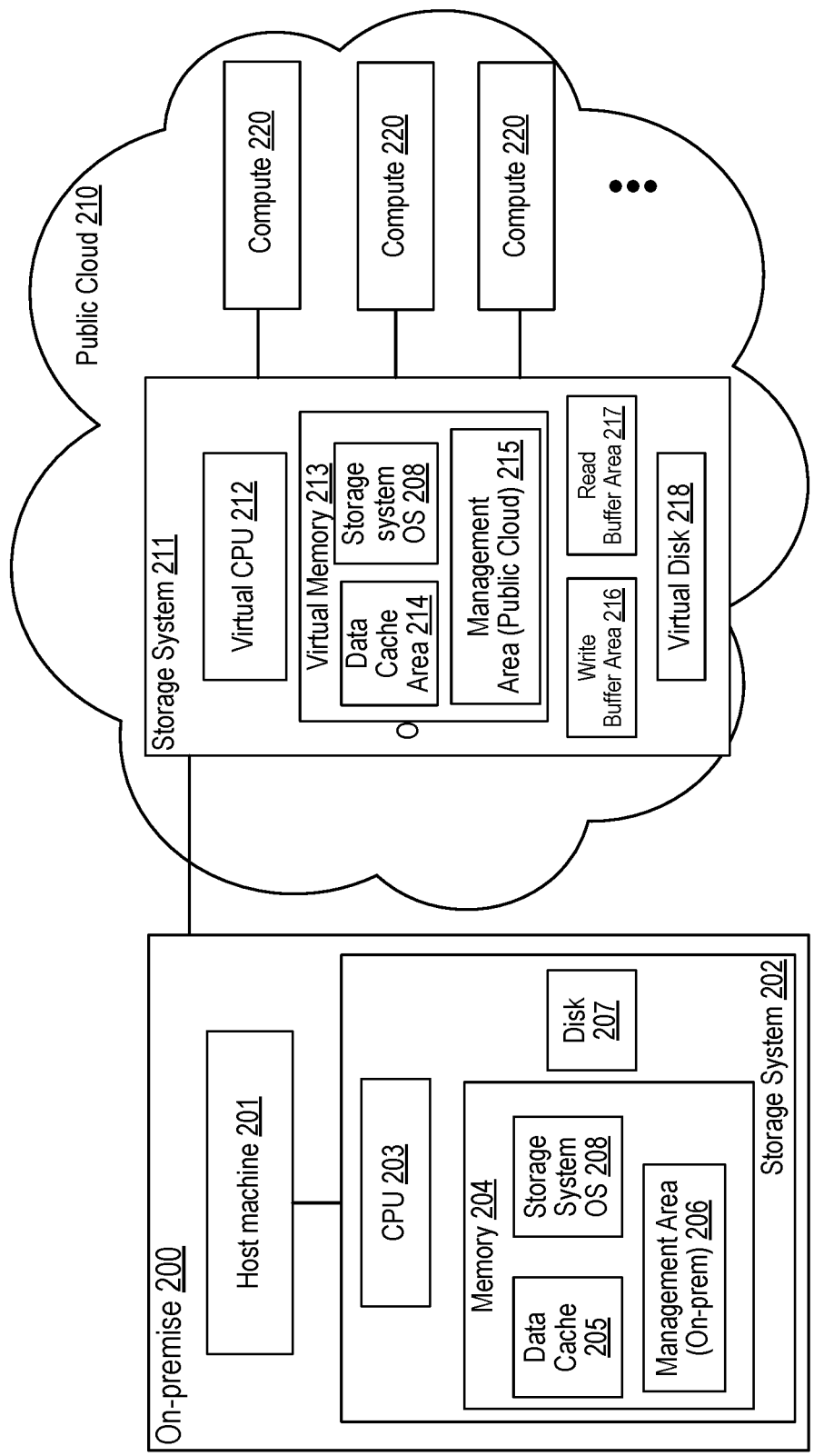
FIG. 2 illustrates an example of a logical configuration of the system in which the method and apparatus of example implementations described herein may be applied.

FIG. 2 illustrates an example of a logical configuration of the system in which the method and apparatus of example implementations described herein may be applied. As illustrated in FIG. 2, on-premise system can involve a host machine 201 and a storage system 202. Storage system can include one or more hardware processor(s) 203 such as Central Processing Units (CPU), a memory 204, and a storage disk 207. Memory 204 can be configured to manage data cache 205 and on-premise management area 206.

Public cloud 210 can include one or more storage systems 211. Each of the one or more storage systems 211 can involve a virtual CPU 212, a virtual memory 213, a write buffer area 216, a read buffer area 217 and virtual disk 218. Virtual memory 213 can include a data cache area 214 and a management area for the public cloud 215. The one or more storage systems 211 can be configured to receive commands by one or more compute machines 220.

In an example implementation, the data cache area 205 is the buffer area in a memory 204. Write/read buffer area 216 and 217 may be implemented in virtual memory 213 or virtual disk 218, depending on the user needs and storage system specifications.

In example implementations described herein, processor (s) 203 and virtual CPU 212 execute a dedicated storage system operating software (OS) 208 to facilitate transactions between the on-premise system 200 and the public cloud 210 and for managing the storage systems 202 on the on-premise system 200 and the storage systems 211 on the public cloud 210.

Figure 3:
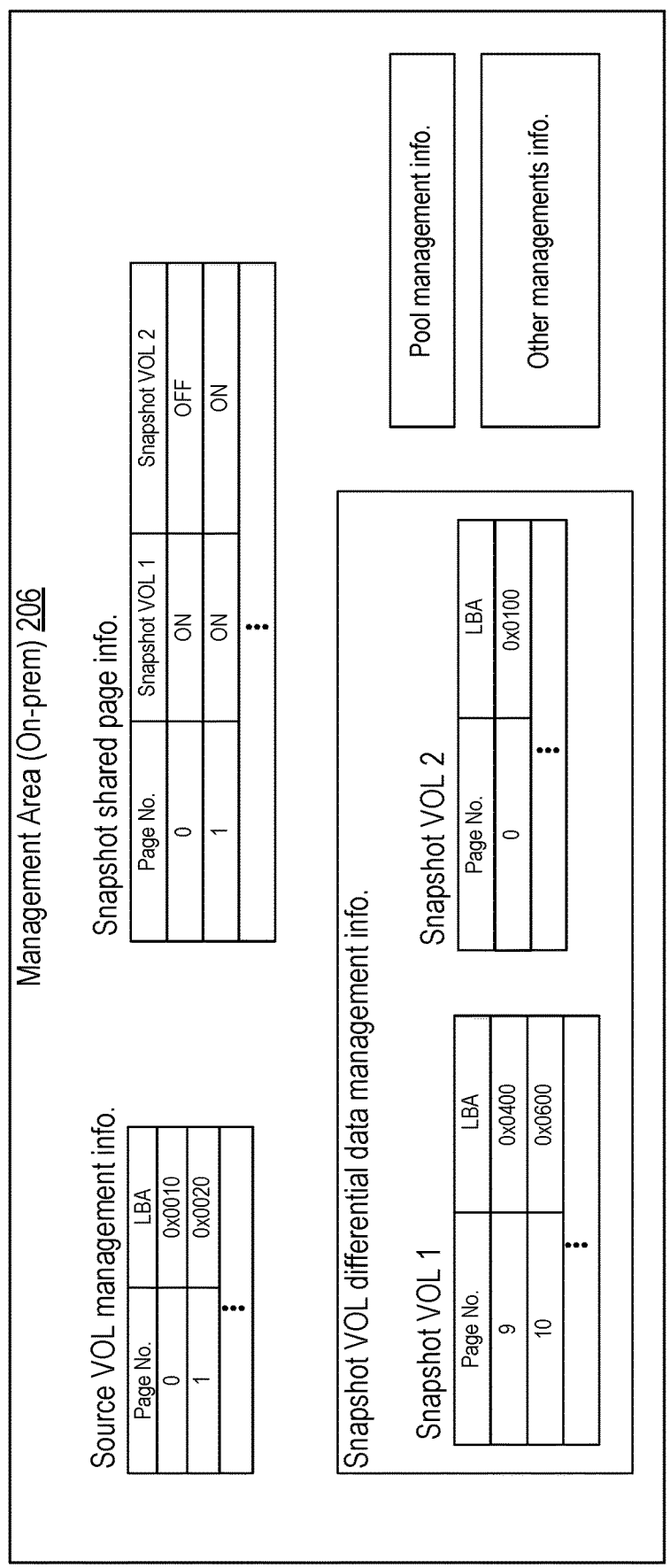
FIG. 3 illustrates an example of the management area in the on-premise storage, in accordance with an example implementation.
Figure 5:
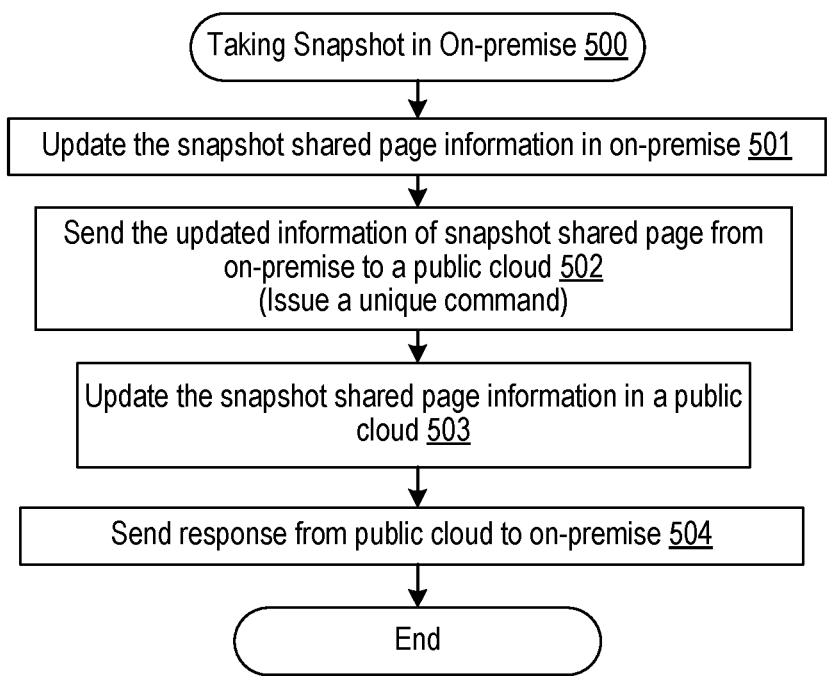
FIG. 5 illustrates the process creating/updating the snapshot shared page information in the public cloud, in accordance with an example implementation.

In an example function of the storage system OS 208 and as illustrated in FIG. 1-5, responsive to an update to one or more of a plurality of snapshot volumes in the storage system 102, the storage system OS 208 can execute instructions on the on-premise system 100, 200 according to FIG. 5 including updating first shared page information stored in the first storage system 102, 202 according to the update to the one or more snapshot volumes as shown at 501, the first shared page information indicative of pages shared between the plurality of snapshot volumes in the first storage system 102, 202 as illustrated in FIG. 3; transmitting instructions to the second storage system 111, 211 to copy the updates to the one or more snapshot volumes from the first shared page information to a second shared page information stored in the second storage system 111, 211 as illustrated in FIG. 1 and at 502 of FIG. 5; and executing read or write operations made to the second storage system based on the second shared page information as illustrated in FIG. 1. In example implementations, a special command function provided in the storage system OS 208 is utilized to facilitate the copying of snapshot information from the on-premise system 100, 200 to the public cloud system 110, 210.

Figure 6:
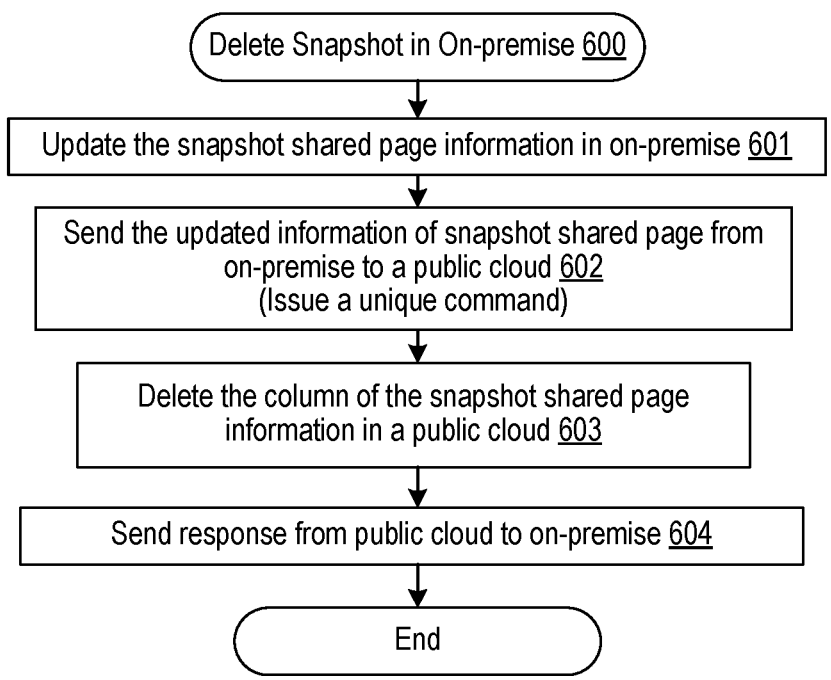
FIG. 6 illustrates the process of deleting a snapshot in the on-premise system, in accordance with an example implementation.

In example implementations, the storage system OS 208 can execute an update to the one or more of the plurality of snapshot volumes in the first storage system 102, 202 involving a deletion of the one or more of the plurality of snapshot volumes as illustrated in FIG. 6, wherein the instructions to the second storage system 111, 211 to copy the updates from the first shared page information involves a deletion of the one or more of the plurality of snapshot volumes from the second shared page information, such as deleting a column corresponding to the snapshot volume from the snapshot shared page information as described at 603 of FIG. 6. Similarly, in example implementations, the storage system OS 208 can generate one or more of the plurality of snapshot volumes, wherein the instructions to the second storage system to copy the updates from the first shared page information would thereby involve an addition of the one or more of the plurality of snapshot volumes to the second shared page information through the addition of a snapshot volume column to the snapshot shared page information illustrated in FIG. 3.

Figure 8:
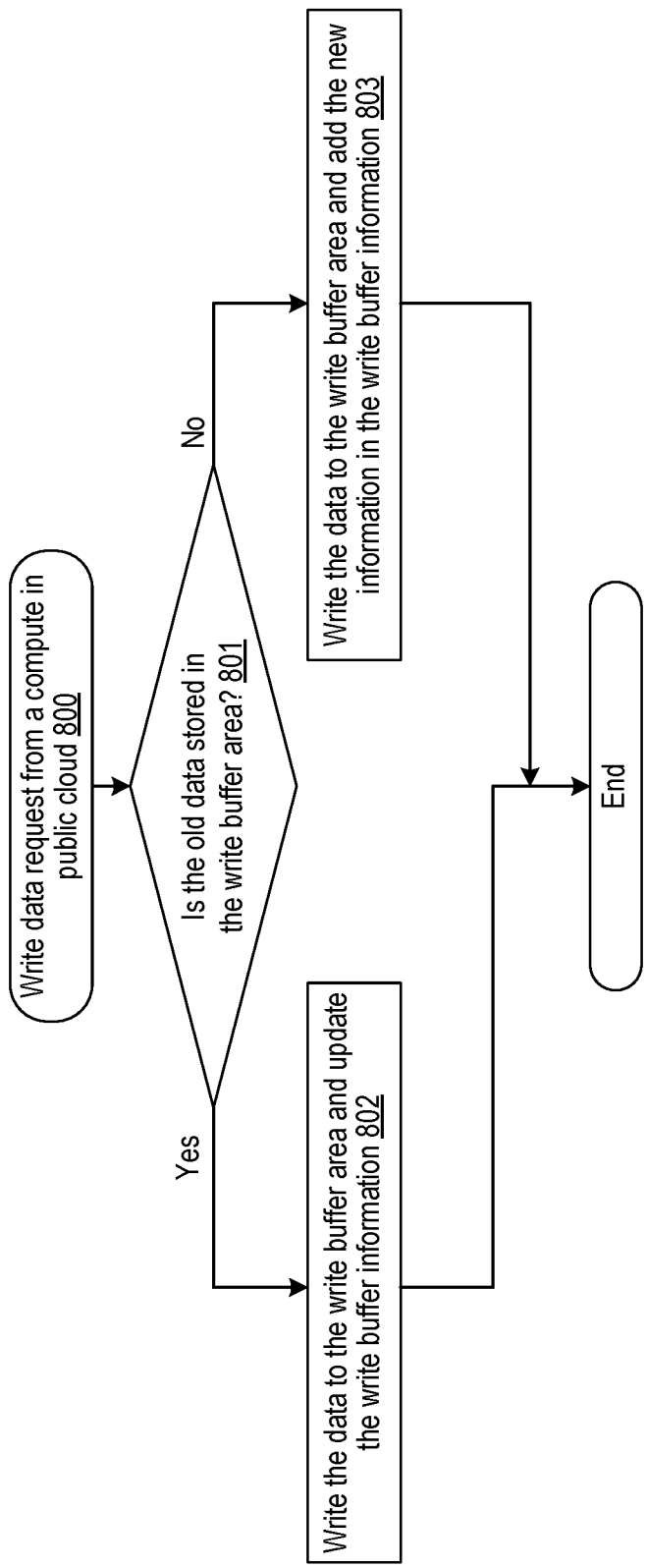
FIG. 8 illustrates the process of write data request from a compute in a public cloud, in accordance with an example implementation.

In an example, storage system OS 208 can execute the read or the write operations made to the second storage system based on the second shared page information by executing the flow diagram of FIG. 8 for a write operation made to the second storage system. Such instructions can involve determining if write data corresponding to the write operation is stored in a write buffer of the second storage system based on referring to the second shared page information and write buffer information indicative of data from one or more clone volumes stored in the write buffer as illustrate at 801 of FIG. 8 and for the determination indicative of the write data corresponding to the write operation being stored in the write buffer, updating the write data in the write buffer and update the write buffer information as illustrated at 802 of FIG. 8; and for the determination indicative of the write data corresponding to the write operation not being stored in the write buffer, write the write data to the write buffer and add information to the write buffer information indicative of the write data as illustrated at 803 of FIG. 8.

Figure 7:
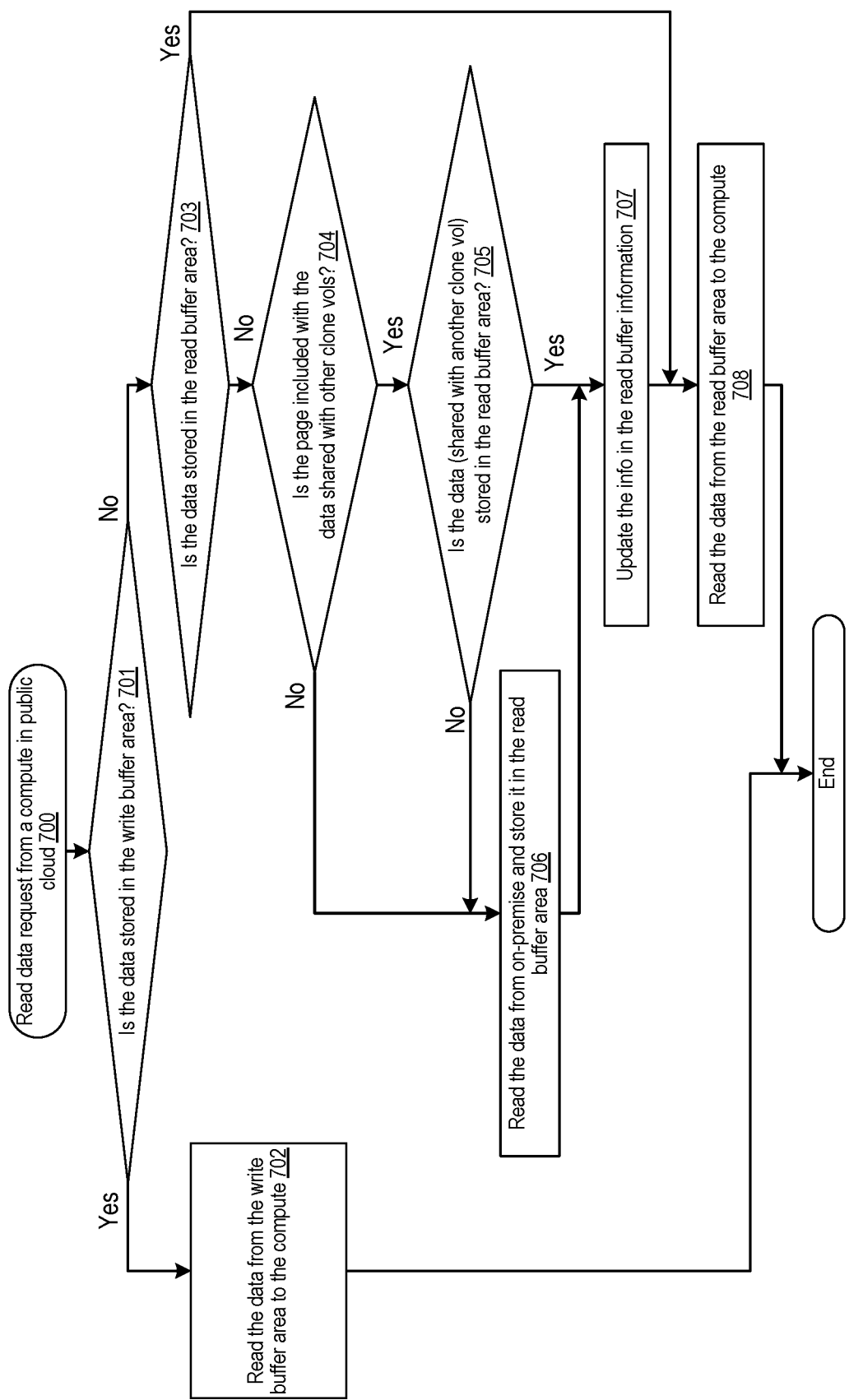
FIG. 7 illustrates the process of read data request from a compute in a public cloud, in accordance with an example implementation.

In another example implementation, storage system OS 208 can conduct the executing of the read or the write operations made to the second storage system based on the second shared page information by executing the flow diagram of FIG. 7 for a read operation made to the second storage system. Such instructions can involve determining if read data corresponding to the read operation is stored in a write buffer of the second storage system based on referring to the second shared page information and write buffer information indicative of data from one or more clone volumes stored in the write buffer as illustrated at 701 of FIG. 7 and for the determination indicative of the read data corresponding to the read operation being stored in the write buffer, reading the read data from the write buffer and responding to the read operation with the read data from the write buffer as illustrated at 702 of FIG. 7.

Similarly, storage system OS 208 can further execute, for the determination indicative of the read data corresponding to the read operation not being stored in the write buffer, determining if the read data corresponding to the read operation is stored in a read buffer of the second storage system based on referring to the second shared page information and read buffer information indicative of data from one or more clone volumes stored in the read buffer as illustrated at 703 of FIG. 7; and for the determination indicative of the read data corresponding to the read operation being stored in the read buffer, reading the read data from the read buffer and responding to the read operation with the read data from the read buffer as illustrated at 708 of FIG. 7.

Similarly, storage system OS 208 can further execute the read or the write operations made to the second storage system based on the second shared page information by, for the determination indicative of the read data corresponding to the read operation not being stored in the read buffer, reading the read data from the first storage system and storing the read data from the first storage system in the read buffer of the second storage system as illustrated at 706 of FIG. 7; updating the read buffer information based on the read data from the first storage system as illustrated at 707 of FIG. 7, and responding to the read operation with the read data i the read buffer read from the first storage system as illustrated at 708 of FIG. 7. Storage system OS 208 can determine if the read data corresponding to the read operation is stored in the read buffer of the second storage system based on referring to the second shared page information and read buffer information indicative of data from one or more clone volumes stored in the read buffer by determining if a page in the read data corresponding to the read operation is shared with at least one of the one or more clone volumes and data corresponding to the page is stored in the read buffer as illustrated at 704 and 705 of FIG. 7; for the determination that the page is shared with at least one of the one or more clone volumes and the data corresponding to the page is stored in the read buffer, determining that the read data corresponding to the read operation is stored in the read buffer and proceeding to 707 of FIG. 7; and for the determination that the page is shared with at least one of the one or more clone volumes and the data corresponding to the page is stored in the read buffer, determining that the read data corresponding to the read operation is not stored in the read buffer and proceeding to 706 of FIG. 7.

FIG. 3 illustrates an example of the management area in the on-premise storage 206, in accordance with an example implementation. Source VOL management information includes the page number and Logical Block Address (LBA). Snapshot shared page information indicates whether pages are shared with snapshot volumes or not (e.g., ON indicates shared, OFF indicates non-shared.). Snapshot VOL differential data management information shows the differential data information from the source volume. For instance, the differential data is created when the source data is updated after taking a snapshot. Such differential data is managed through the snapshot VOL differential data. The updated data is stored in the pool, which is reflected in the pool management information. Further, other information such as network interfaces, non-snapshot volumes management info and so on, can be utilized to manage the storage system depending on the desired implementation.

FIG. 4 illustrates the management area in a public cloud 215, in accordance with an example implementation. Snapshot shared page information is the same as that in the management area of the on-premise system 206. Clone volume information shows the relationship between clone volumes and snapshot volumes. This is also managed the LBAs of clone volumes. Write buffer information manages the write buffer area 216, and read buffer information manage the read buffer area 217. Other management information, such as network interfaces, non-snapshot volumes management information and so on, can also be included to facilitate the desired implementation.

FIG. 5 illustrates the process creating/updating the snapshot shared page information in the public cloud, in accordance with an example implementation. This information is newly created at the time of the first occurrence of clone volume creation. Further, this information is updated when a new snapshot is created in the on-premise system. When such incidents occur, the storage system in the on-premise system sends the updated info to the storage system in the public cloud.

At 500, the taking of the snapshot in the on-premise system is invoked. At 501, the snapshot shared page information in the on-premise system is updated. At 502, the updated information of the snapshot shared page is sent from the on-premise system to the public cloud. To facilitate such an implementation, the on-premise system and the public cloud can be configured to utilize a specialized operating system/protocol in which the on-premise system issues a unique command to send information and update the snapshot shared page on the public cloud.

At 503, the snapshot shared page information in a public cloud is updated. At 504, once the snapshot shared page information is updated, a response is sent from the public cloud to the on-premise system to indicate success or failure.

FIG. 6 illustrates the process of deleting a snapshot in the on-premise system, in accordance with an example implementation. When the deletion of a snapshot has occurred, the portion or the entire snapshot of the on-premise system as well as the snapshot information stored in the public cloud should be deleted.

At 600, the process for the deletion of the snapshot in the on-premise system is initiated. At 601, the snapshot shared page information in the on-premise system is updated with the deletion. At 602, the process sends the updated information regarding the deletion of the snapshot shared page from the on-premise system to the public cloud. To facilitate such an implementation, the on-premise system and the public cloud can be configured to utilize a specialized operating system/protocol in which the on-premise system issues a unique command to send information and update the snapshot shared page on the public cloud.

At 603, the public cloud receives the command and deletes the corresponding column(s) of the snapshot shared page information. At 604, the public cloud sends a response to the on-premise system to indicate success or failure.

In example implementations, the same flow diagram for FIG. 6 can be used to operate on the addition of a snapshot in the on-premise system, with the process for deletion changed to adding a snapshot, and the snapshot shared page information being updated to add a column for the newly generated snapshot volume.

FIG. 7 illustrates the process of read data request from a compute in a public cloud, in accordance with an example implementation. The process is invoked at 700 when a read data request from a compute in public cloud is received.

At 701, the process confirms whether the target data is stored in the write buffer area or not, since the newest data are stored in the write buffer area. If so (Yes), then the process proceeds to 702 to read the data from the write buffer area and forward the data to the corresponding compute.

Otherwise (No), the process proceeds to 703 to determine whether the target data is stored in the read buffer area or not. If so (Yes) then the process proceeds to 708 to read the data from the read buffer area and forward the data to the corresponding compute. Otherwise (No) the process proceeds to 704 to confirm whether the page included with the address of the target data is shared with other clone volumes or not. Such a confirmation can be conducted with the clone volume information and the snapshot shared page information (e.g., referring to the LBA to determine the corresponding page, and then determining if the page corresponds to a page managed by a clone volume or shared by a clone volume based on the read buffer information). If it cannot be confirmed (No), then the process proceeds to 706 to read the data from the on-premise system, store the data in the read buffer area, update the read buffer information 707 and read the target data for providing to the compute 708.

Otherwise (Yes), the target data is stored in the read buffer area by another compute. In such a situation, the process can proceed to 707 to update the read buffer information (e.g., add a line) and read the data from the read buffer area at 708.

FIG. 8 illustrates the process of write data request from a compute in a public cloud, in accordance with an example implementation. The process is invoked at 800 on receipt of a write data request from a compute in a public cloud.

At 801, the process confirms whether the target data have been updated before or not (e.g., is the write buffer data old). Such process is confirmed by determining if the write buffer data already exists in the write buffer information of the management area of the public cloud, as well as referring to the snapshot shared page information and clone volume information to determine if LBA addresses indicated in the write buffer information correspond to any shared snapshot pages that also correspond to the write buffer data. If so (Yes), then the process proceeds to 802 to write the updated data to the write buffer area and updated the write buffer information since it still contains old write buffer data. Otherwise (No), the process proceeds to 803 to write the updated data to the write buffer area and add the new information in the write buffer information.

Accordingly, example implementations described herein are directed to minimizing the amount of data transferred between the on-premise system to a public cloud, for customers who want to work with a compute machine of the public cloud using data stored in the on-premise system. Example applications can involve dev/test, however customers can use it in other use cases such as analytics. Users can confirm that this function is set in the user manual and the setting screen.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for managing a first storage system for an on-premise system and a second storage system for a public cloud system, the method comprising:
    responsive to an update to one or more of a plurality of snapshot volumes in the first storage system, updating first shared page information stored in the first storage system according to the update to the one or more snapshot volumes, the first shared page information indicative of pages shared between the plurality of snapshot volumes in the first storage system;
    transmitting instructions to the second storage system to copy the updates to the one or more snapshot volumes from the first shared page information to a second shared page information stored in the second storage system; and
    executing read or write operations made to the second storage system based on the second shared page information.

2. The method of claim 1, wherein the update to the one or more of the plurality of snapshot volumes in the first storage system comprises a deletion of the one or more of the plurality of snapshot volumes, wherein the instructions to the second storage system to copy the updates from the first shared page information comprises a deletion of the one or more of the plurality of snapshot volumes from the second shared page information.

3. The method of claim 1, wherein the update to the one or more of the plurality of snapshot volumes in the first storage system comprises a generation of one or more of the plurality of snapshot volumes, wherein the instructions to the second storage system to copy the updates from the first shared page information comprises an addition of the one or more of the plurality of snapshot volumes to the second shared page information.

4. The method of claim 1, wherein the executing the read or the write operations made to the second storage system based on the second shared page information comprises:
    for a write operation made to the second storage system, determining if write data corresponding to the write operation is stored in a write buffer of the second storage system based on referring to the second shared page information and write buffer information indicative of data from one or more clone volumes stored in the write buffer;
    for the determination indicative of the write data corresponding to the write operation being stored in the write buffer, updating the write data in the write buffer and updating the write buffer information; and
    for the determination indicative of the write data corresponding to the write operation not being stored in the write buffer, write the write data to the write buffer and add information to the write buffer information indicative of the write data.

5. The method of claim 1, wherein the executing the read or the write operations made to the second storage system based on the second shared page information comprises:
    for a read operation made to the second storage system, determining if read data corresponding to the read operation is stored in a write buffer of the second storage system based on referring to the second shared page information and write buffer information indicative of data from one or more clone volumes stored in the write buffer;
    for the determination indicative of the read data corresponding to the read operation being stored in the write buffer, reading the read data from the write buffer and responding to the read operation with the read data from the write buffer.

6. The method of claim 5, wherein the executing the read or the write operations made to the second storage system based on the second shared page information further comprises:
    for the determination indicative of the read data corresponding to the read operation not being stored in the write buffer, determining if the read data corresponding to the read operation is stored in a read buffer of the second storage system based on referring to the second shared page information and read buffer information indicative of data from one or more clone volumes stored in the read buffer;
    for the determination indicative of the read data corresponding to the read operation being stored in the read buffer, reading the read data from the read buffer and responding to the read operation with the read data from the read buffer.

7. The method of claim 6, wherein the executing the read or the write operations made to the second storage system based on the second shared page information further comprises:

for the determination indicative of the read data corresponding to the read operation not being stored in the read buffer, reading the read data from the first storage system and storing the read data from the first storage system in the read buffer of the second storage system;
updating the read buffer information based on the read data from the first storage system, and
responding to the read operation with the read data in the read buffer read from the first storage system.

8. The method of claim 6, wherein the determining if the read data corresponding to the read operation is stored in the read buffer of the second storage system based on referring to the second shared page information and read buffer information indicative of data from one or more clone volumes stored in the read buffer comprises:
determining if a page in the read data corresponding to the read operation is shared with at least one of the one or more clone volumes and data corresponding to the page is stored in the read buffer; and
for the determination that the page is shared with at least one of the one or more clone volumes and the data corresponding to the page is stored in the read buffer, determining that the read data corresponding to the read operation is stored in the read buffer; and
for the determination that the page is shared with at least one of the one or more clone volumes and the data corresponding to the page is stored in the read buffer, determining that the read data corresponding to the read operation is not stored in the read buffer.

9. A non-transitory computer readable medium, storing instructions for managing a first storage system for an on-premise system and a second storage system for a public cloud system, the instructions comprising:
responsive to an update to one or more of a plurality of snapshot volumes in the first storage system, updating first shared page information stored in the first storage system according to the update to the one or more snapshot volumes, the first shared page information indicative of pages shared between the plurality of snapshot volumes in the first storage system;
transmitting instructions to the second storage system to copy the updates to the one or more snapshot volumes from the first shared page information to a second shared page information stored in the second storage system; and
executing read or write operations made to the second storage system based on the second shared page information.

10. The non-transitory computer readable medium of claim 9, wherein the update to the one or more of the plurality of snapshot volumes in the first storage system comprises a deletion of the one or more of the plurality of snapshot volumes, wherein the instructions to the second storage system to copy the updates from the first shared page information comprises a deletion of the one or more of the plurality of snapshot volumes from the second shared page information.

11. The non-transitory computer readable medium of claim 9, wherein the update to the one or more of the plurality of snapshot volumes in the first storage system comprises a generation of one or more of the plurality of snapshot volumes, wherein the instructions to the second storage system to copy the updates from the first shared page information comprises an addition of the one or more of the plurality of snapshot volumes to the second shared page information.

12. The non-transitory computer readable medium of claim 9, wherein the executing the read or the write operations made to the second storage system based on the second shared page information comprises:
for a write operation made to the second storage system, determining if write data corresponding to the write operation is stored in a write buffer of the second storage system based on referring to the second shared page information and write buffer information indicative of data from one or more clone volumes stored in the write buffer;
for the determination indicative of the write data corresponding to the write operation being stored in the write buffer, updating the write data in the write buffer and updating the write buffer information; and
for the determination indicative of the write data corresponding to the write operation not being stored in the write buffer, write the write data to the write buffer and add information to the write buffer information indicative of the write data.

13. The non-transitory computer readable medium of claim 9, wherein the executing the read or the write operations made to the second storage system based on the second shared page information comprises:
for a read operation made to the second storage system, determining if read data corresponding to the read operation is stored in a write buffer of the second storage system based on referring to the second shared page information and write buffer information indicative of data from one or more clone volumes stored in the write buffer;
for the determination indicative of the read data corresponding to the read operation being stored in the write buffer, reading the read data from the write buffer and responding to the read operation with the read data from the write buffer.

14. The non-transitory computer readable medium of claim 13, wherein the executing the read or the write operations made to the second storage system based on the second shared page information further comprises:
for the determination indicative of the read data corresponding to the read operation not being stored in the write buffer, determining if the read data corresponding to the read operation is stored in a read buffer of the second storage system based on referring to the second shared page information and read buffer information indicative of data from one or more clone volumes stored in the read buffer;
for the determination indicative of the read data corresponding to the read operation being stored in the read buffer, reading the read data from the read buffer and responding to the read operation with the read data from the read buffer.

15. The non-transitory computer readable medium of claim 14, wherein the executing the read or the write operations made to the second storage system based on the second shared page information further comprises:
for the determination indicative of the read data corresponding to the read operation not being stored in the read buffer, reading the read data from the first storage system and storing the read data from the first storage system in the read buffer of the second storage system;
updating the read buffer information based on the read data from the first storage system, and
responding to the read operation with the read data in the read buffer read from the first storage system.

16. The non-transitory computer readable medium of claim 14, wherein the determining if the read data corresponding to the read operation is stored in the read buffer of the second storage system based on referring to the second shared page information and read buffer information indicative of data from one or more clone volumes stored in the read buffer comprises:

determining if a page in the read data corresponding to the read operation is shared with at least one of the one or more clone volumes and data corresponding to the page is stored in the read buffer; and for the determination that the page is shared with at least one of the one or more clone volumes and the data corresponding to the page is stored in the read buffer, determining that the read data corresponding to the read operation is stored in the read buffer; and for the determination that the page is shared with at least one of the one or more clone volumes and the data corresponding to the page is stored in the read buffer, determining that the read data corresponding to the read operation is not stored in the read buffer.

\* \* \* \* \*